United States Patent [19]

Okazaki

[11] Patent Number: 5,463,719
[45] Date of Patent: Oct. 31, 1995

[54] FUZZY INFERENCE OPERATION METHOD AND A DEVICE THEREFOR

[75] Inventor: Hiroshi Okazaki, Tokyo, Japan

[73] Assignee: NEC Corporation, Tokyo, Japan

[21] Appl. No.: 961,108

[22] Filed: Oct. 14, 1992

[30] Foreign Application Priority Data

Oct. 16, 1991 [JP] Japan ................................. 3-267944

[51] Int. Cl.$^6$ .................................................. G06F 15/18
[52] U.S. Cl. ................................. 395/51; 395/3; 395/61; 364/400; 364/130
[58] Field of Search ............................. 395/3, 51, 61, 395/67, 76, 900; 364/400, 401, 130

[56] References Cited

U.S. PATENT DOCUMENTS

| | | | |
|---|---|---|---|
| 4,860,214 | 8/1989 | Matsuda et al. | 395/51 |
| 4,875,184 | 10/1989 | Yamakawa | 395/3 |
| 5,003,860 | 4/1991 | Minamitaka | 84/609 |
| 5,073,863 | 12/1991 | Zhang | 395/51 |

OTHER PUBLICATIONS

A Fuzzy Inference Coprocessor Using a Flexible Active Rule–Driven Architecture H. Ikeda, Y. Hiramoto, S. Nakamura IEEE/8–12 Mar. 1992.

Primary Examiner—Allen R. MacDonald
Assistant Examiner—Richemond Dorvil
Attorney, Agent, or Firm—Whitham, Curtis, Whitham & McGinn

[57] ABSTRACT

In a fuzzy inference operation method according to the present invention, the condition part membership function is referred to according to a singleton input variable so as to determine the condition part membership value and then the determined condition part membership value is judged whether it is the minimum value for a membership value. If so, the minimum value is used as the desired membership value and the system omits the MIN and MAX value operations for the applicable condition part membership value and jumps to the MIN-MAX operation under the next rule. Besides, a fuzzy inference operation device comprises a condition part membership value judgment means to judge whether the condition part membership value determined by the condition part membership value determining means is the minimum membership value or not and a control means which omits the operations by the MIN value operation means and the MAX value operation means for the applicable condition part membership value if it is judged to be the minimum membership value.

5 Claims, 7 Drawing Sheets

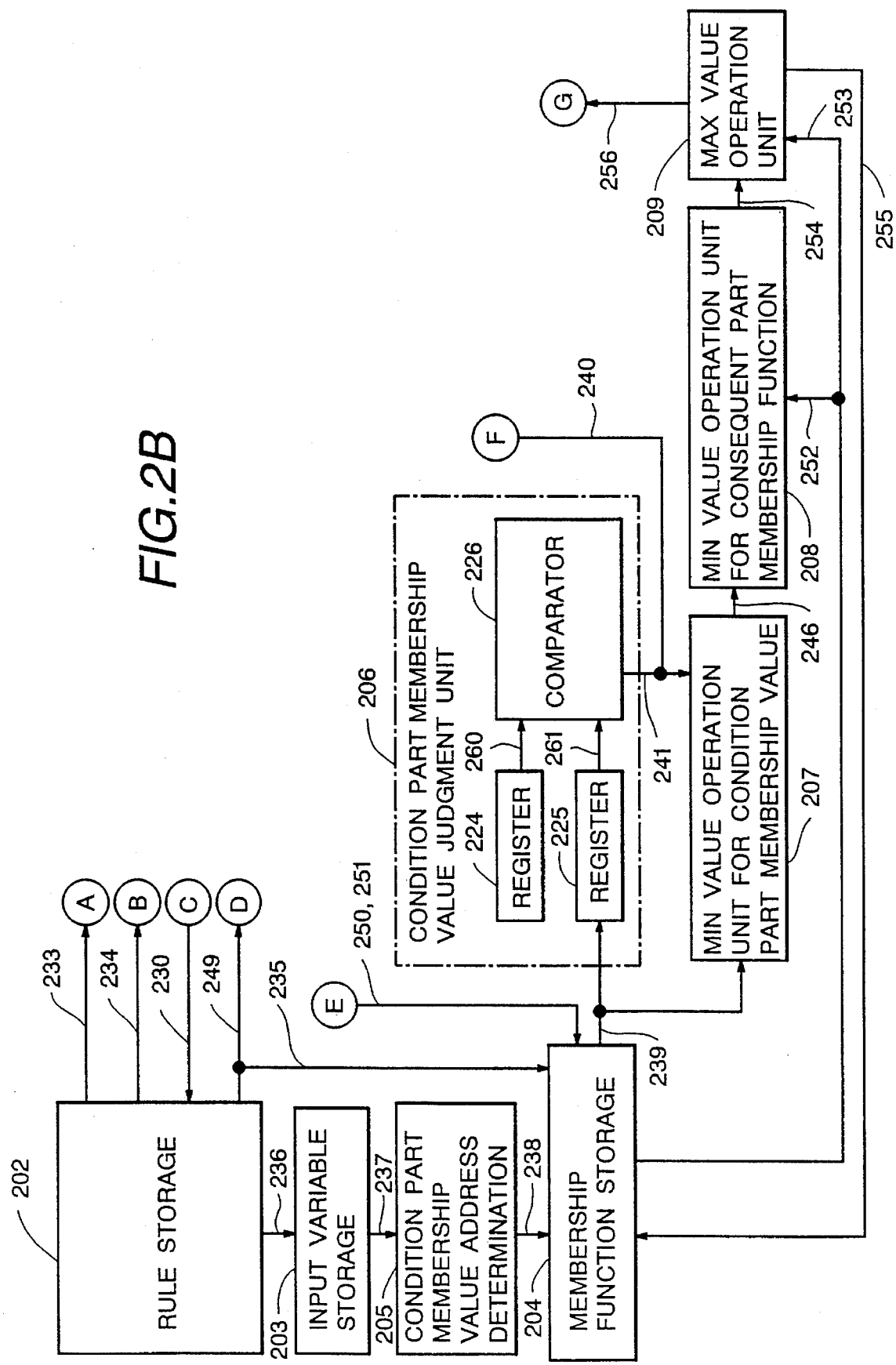

CONDITION MEMBERSHIP FUNCTION (a)
TEMPERATURE

INPUT (20°C)

CONDITION MEMBERSHIP FUNCTION (b)
HUMIDITY

INPUT (70%)

CONCLUSION PART MEMBERSHIP FUNCTION
FAN ROTATION STRENGTH

FAN ROTATION STRENGTH

FAN ROTATION STRENGTH

ANTECEDENT PART MEMBERSHIP FUNCTION (a)

INPUT VARIABLE

ANTECEDENT PART MEMBERSHIP FUNCTION (a)

INPUT VARIABLE

ANTECEDENT PART MEMBERSHIP FUNCTION (c)

INPUT VARIABLE

FAN ROTATION STRENGTH

AFTER MIN VALUE OPERATION

MIN VALUE OPERATION RESULT (a)

MIN VALUE OPERATION RESULT (b)

MIN VALUE OPERATION RESULT (c)

MIN VALUE OPERATION RESULT (d)

FUZZY INFERENCE OPERATION METHOD AND A DEVICE THEREFOR

BACKGROUNDS OF THE INVENTION

1. Field of the Invention

The present invention relates to a fuzzy inference operation method and a device therefor, and particularly relates to a fuzzy inference operation method enabling reduced operation time for MIN and MAX value operations and a device therefor.

2. Description of the Prior Art

A conventional fuzzy inference operation device using the MIN-MAX method is illustrated in FIGS. 4 to 6 and comprises a membership value determination means which determines the membership value for condition parts referring to condition part membership functions (a) 401, (b) 403 and (c) 405 according to singleton input variables 402, 404 and 406 as shown in FIGS. 4A, 4B and 4C, a MIN value operation means which compares two or more condition part membership values to take the smaller one as the result as shown in FIG. 4E, and a MAX value operation means which compares two or more membership values or the results of MIN value operations (a) 501, (b) 502 and (c) 503 as shown in FIGS. 5A, 5B and 5C to take the largest one as the MAX value operation result 504. It is also provided with rules specifying which condition part membership function is to be referred to by a singleton input variable for determination of the membership value, which membership value is used for MIN value operation and which conclusion part membership function 407 as shown in FIG. 4D is kept.

Now, referring to FIG. 6, the fuzzy inference operation processing according to the MIN-MAX method is described. The conclusion number is supposed to be 1 here.

The variable c is set to 0 (Step 601). The condition part membership value is determined by referring to the condition part membership function as specified by the rules corresponding to the singleton input variable as shown in FIGS. 4A, 4B and 4C (Step 602). A MIN value operation is executed for the condition part membership value as specified by the rules (Step 603). Another MIN value operation is executed for the result from the MIN value operation 603 and the conclusion part membership function (Step 604). The result of the MIN value operation 604 and the result of the previous MAX value operation 605 are subjected to a MAX value operation (Step 605). Steps 602 to 605 are executed for a number of times equal to the number of rules (Step 606).

As described above, the conventional fuzzy inference operation using the MIN-MAX method comprises the first MIN value operation for the condition part membership value (Step 603 in FIG. 6), the second MIN value operation using the result of the MIN value operation and the conclusion part membership function (Step 604 in FIG. 6) and the MAX value operation using the result of the preceding MIN value operation and the result of the MAX value operation according to the previous rule (Step 605 in FIG. 6).

Referring to FIG. 4, when any of the condition part membership values is the minimum value μ-min which is the smallest value a membership value can take (FIG. 4A), the result of the second MIN value operation becomes the minimum value μ-min, and the membership value as a result of the second MIN value operation is the minimum value μ-min for the entire range. In this case, the rules do not affect the operation result, with the results of the first and the second MIN value operations (Steps 603 and 604 in FIG. 6) and the MAX value operation (Step 605 in FIG. 6) unused. This means that the operation is prolonged by useless processes.

SUMMARY OF THE INVENTION

It is an object of the present invention to provide a fuzzy inference operation method and a fuzzy inference operation device which enables reduced operation time by eliminating the above drawbacks and omitting MIN and MAX value operations under certain conditions.

According to an embodiment of the present invention to attain the above object, a fuzzy inference operation method comprises a step where the condition part membership function is referred to according to a singleton input variable for determination of a condition part membership value, a step where, after determination of the condition part membership value, it is judged whether the determined condition part membership value is the predetermined minimum value for a membership value, a step to take the above minimum value as the desired membership value when the condition part membership value is judged to be the minimum value for a membership value, and a step to determine a membership value by executing predetermined MIN and MAX value operations for the determined condition part membership value when it is not judged to be the minimum value.

According to another preferred embodiment of the present invention to attain the above object, a fuzzy inference operation method comprises a step where the condition part membership function is referred to according to a singleton input variable for determination of a condition part membership value, a step where, after determination of the condition part membership value, it is judged whether the determined condition part membership value is the predetermined minimum value for a membership value, a step to take the above minimum value as the finally desired membership value when the condition part membership value is the minimum value for a membership value, a step for MIN value operation which compares two or more membership values and takes the smaller one as the operation result when the condition part membership value is not the minimum membership value, a step where the determination of condition part membership value, the minimum value judgment for the condition part membership value, and the MIN value operation for the condition part membership value as above are repeated for the times equal to the predetermined condition number, a step for MIN value operation using the result of the above MIN value operation and the conclusion part membership function, a step where the MIN value operation using the result of said MIN value operation and the conclusion part membership function are repeated for the times equal to the division number for the membership function, a step for judgment to see whether any MAX value operation has been executed, a step to take the result of the MIN value operation using the result of the previous MIN value operation and the conclusion part membership function as the MAX value operation result when a MAX value operation has been executed, and a step where MAX value operation is executed using the result of the MIN value operation based on the previous MIN value operation result and the conclusion part membership function and the result of the MAX value operation under immediately preceding rule when any MAX value operation has not been executed.

According to a preferred embodiment of the present invention to attain the above object, a fuzzy inference operation device comprises a condition part membership value determination means which refers to the condition part membership function according to a singleton input variable for determination of a condition part membership value, a MIN value operation means which compares two or more condition part membership values and takes the smaller one as the operation result, a MAX value operation means which compares two or more condition part membership values and takes the larger one as the operation result, a rule storage means which store the rules specifying said operations, a condition part membership value judgment means which judges whether the condition part membership value determined by said condition part membership value determination means is the minimum value for a membership value or not, and a control means which, when the condition part membership value is judged to be the minimum value by the condition part membership value judgment means, controls the system to omit the operations by said MIN and MAX value operation means for the applicable condition part membership value.

According to another preferred embodiment of a fuzzy inference operation device, the condition part membership value judgment means comprises a register to store the minimum value for a membership value and a comparator to compare the condition part membership value determined by said condition part membership value determination means with the minimum membership value stored in said register.

According to still another embodiment of the present invention to attain the above object, a fuzzy inference operation device comprises a condition part membership value determination means which refers to the condition part membership function according to a singleton input variable for determination of a condition part membership value, a MIN value operation means which compares two or more membership values and takes the smaller one as the operation result, a MAX value operation means which compares two or more membership values and takes the larger one as the operation result, a rule storage means which store a plurality of rules specifying the operations, a rule counting means which counts the number of rules to be applied to the operations and fetches the rule applicable to each operation from the rule storage means, and a control means which judges whether the condition part membership value determined by the condition part membership value determination means is the minimum value for a membership value or not, and that requests the MIN value operation means to execute operation if the condition part membership value is not judged to be the minimum value and outputs a signal to increment the count to the rule counting means so as to omit the operations by the MIN and MAX value operation means for the applicable condition part membership value if the condition part membership value is judged to be the minimum value.

According to a further preferred embodiment, the control means comprises a register to store the minimum value for a membership value and a comparator which compares the condition part membership value determined by said condition part membership value determination means with the minimum membership value stored in said register and, if the condition part membership value is not the minimum value, outputs the operation request signal to the MIN value operation means and, if the condition part membership value takes the minimum value, outputs a signal to increment the count to the rule counting means.

Other objects, characteristics and effects of the present invention will be clarified in the detailed description below.

BRIEF DESCRIPTION OF THE DRAWINGS

FIGS. 2A and 2B taken together are a block diagram to show an embodiment of a fuzzy inference operation device according to the present invention;

DESCRIPTION OF THE PREFERRED EMBODIMENT

Referring to the attached figures, preferred embodiments of a fuzzy inference operation method according to the present invention will be described.

Figure 1:
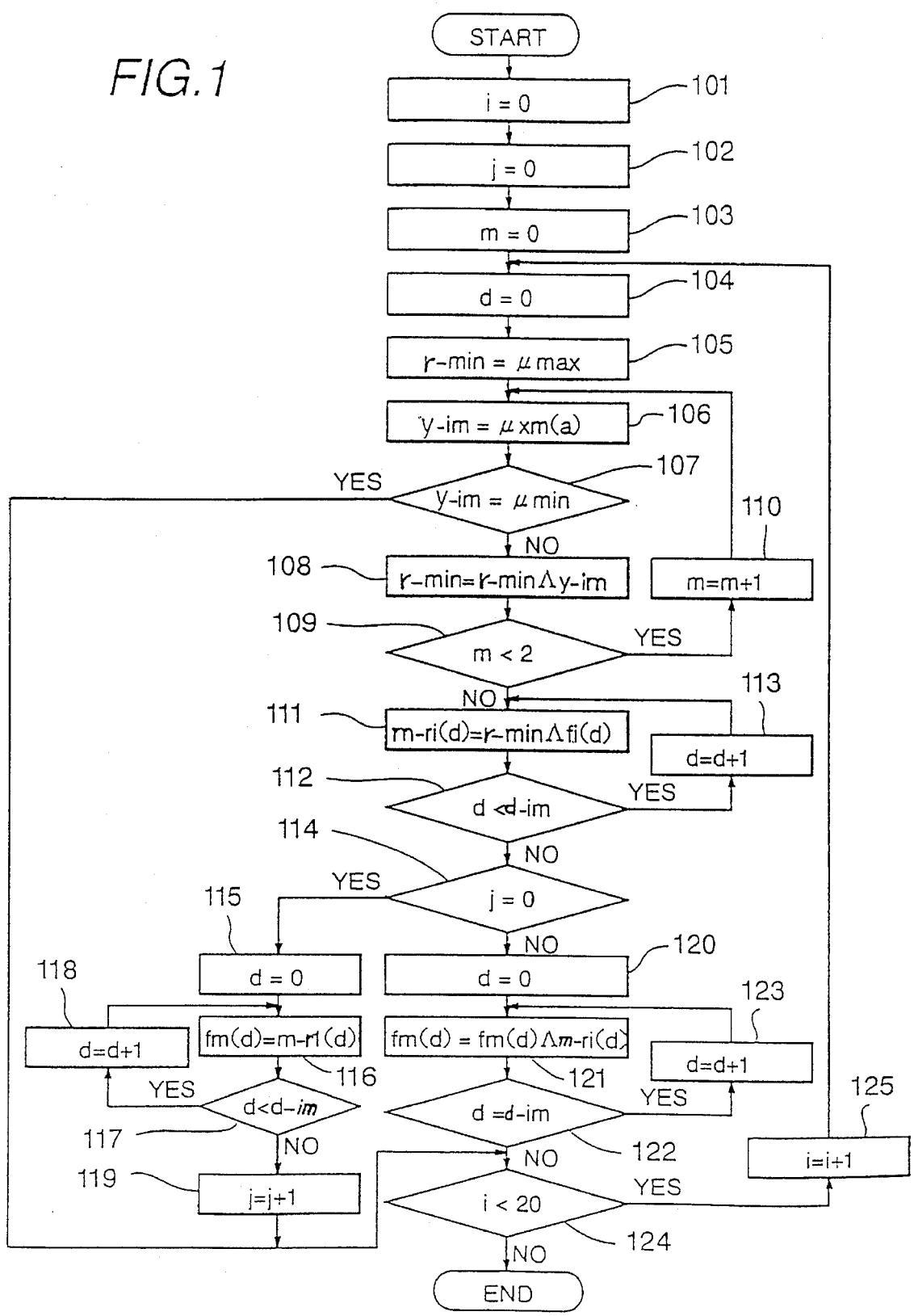
FIG. 1 is a flowchart to show an embodiment of a fuzzy inference operation method according to the present invention.

FIG. 1 is a flowchart to illustrate a fuzzy inference operation method according to the present invention. This flowchart explains the procedure from determination of the condition part membership value to the MAX value operation, assuming that the number of inputs, outputs, conditions conclusions and rules are 2, 1, 2, 1 and 20, respectively.

The variable i for rule number counting is reset (Step 101) and the flag j to indicate whether any MAX value operation has been made is reset (Step 102). Then, the variable m for counting rule condition number is reset (Step 103). The variable d to count the division number for the conclusion part membership function is reset (Step 104). The variable r-min representing the result of the MIN value operation is set to the largest possible value μ-max (1, for example) (Step 105). This maximum value μ-max is given for comparison with the condition part membership value in the first MIN value operation. Given a singleton input variable a, the condition part membership function μ-xm (a) is referred to according to the rules for determination of the condition part membership value y-im (Step 106).

Next, it is judged whether the determined condition part membership value y-im is the smallest possible value μ-min for a membership value (0, for example) (Step 107). When the condition part membership value y-im is equal to the minimum value μ-min, the system skips to the processing in Step 124, omitting the following MIN and MAX value operations.

When the above condition part membership value y-im is larger than the minimum value μ-min, the value y-im and the variable r-min (which takes the maximum value μ-max at first) are subjected to MIN value operation and the result is stored at the variable r-min (Step 108). Then, the variable m for condition number counting is checked to see whether it is less than 2 (Step 109). If so, the variable m is incremented (Step 110) and the system returns to Step 106 where the condition part membership value for the next input variable is determined.

After completing the procedure from Step 106 to Step 108 for the times equal to the number of conditions, a MIN value operation is executed using the MIN value operation result r-min and the conclusion part membership function fi (d) (Step 111). Then, the variable d to count the division number for the conclusion part membership function is checked to see whether it equals the division number dim for the membership function (Step 112). If it is less than the division number dim, the variable d is incremented (Step 113) and the system returns to Step 111. The MIN value operation in Step 111 is repeated for the same times as the division number d-im for the conclusion part membership function.

Then, the flag j is checked to see whether any MAX value operation has been executed (Step 114). When the flag j is 0 (i.e. no MAX value operation has been executed), the variable d to count the division number is reset (Step 115) and the MIN value operation result m-ri (d) is transferred as the MAX value operation result fm (d) (Step 116). Next, the variable d is checked to see whether it equals the division number d-im for the membership function of the conclusion part (Step 117). If it is less than the division number d-im, the variable d is incremented (Step 118) and the system returns to Step 116. When the above procedure has been conducted for the times equal to the division number d-im, the flag j is incremented (Step 119) and the system proceeds to Step 124.

If the flag j is not 0 in Step 114 (i.e. MAX value operation has been executed), the variable d to count the division number is reset (Step 120) and a MAX value operation is executed using the MIN value operation result m-ri (d) and the MAX value operation result fm (d) under the previous rule (Step 121). It is checked whether the variable d to count the division number equals the division number dim for the membership function (Step 122). When it is less than the division number d-im, the variable d is incremented (Step 123) and the system returns to Step 121. The MAX value operation in Step 121 is executed for the times equal to the division number d-im for the conclusion part membership function before the system proceeds to Step 124.

In Step 124, it is judged whether the variable i for rule number counting equals the given rule number 20 or not. If the variable i is less than 20, the variable i is incremented (Step 125) and the division number d is reset in Step 104. If the variable i is equal to the rule number 20, the processing terminates.

As shown in FIG. 1, the present invention is characterized by its Step 107 to judge whether the condition part membership value y-im is equal to the membership value μ-min, which enables the system to jump to Step 124, omitting the MIN and MAX value operation from Steps 108 to 122, when y-im equals μ-min. In the above fuzzy inference operation method, the larger the number of rules, the more remarkable the operation time can be reduced.

FIGS. 3A to 3E show an application example of the fuzzy inference operation according to the present embodiment. In this example, the fuzzy inference operation according to this embodiment is applied to an air conditioner control.

Two rules are set forth here. Rule 1 is "IF the temperature is high and the humidity is high, THEN the fan rotation should be strong". Rule 2 is "IF the temperature is low and the humidity is low, THEN the fan rotation should be weak".

Figure 3A:
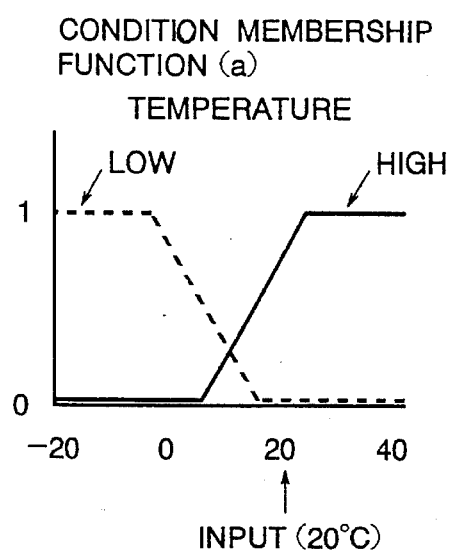
FIG. 3A is a graph showing the condition membership function (a) illustrating the application of the fuzzy inference operation according to a preferred embodiment of the invention.
Figure 3B:
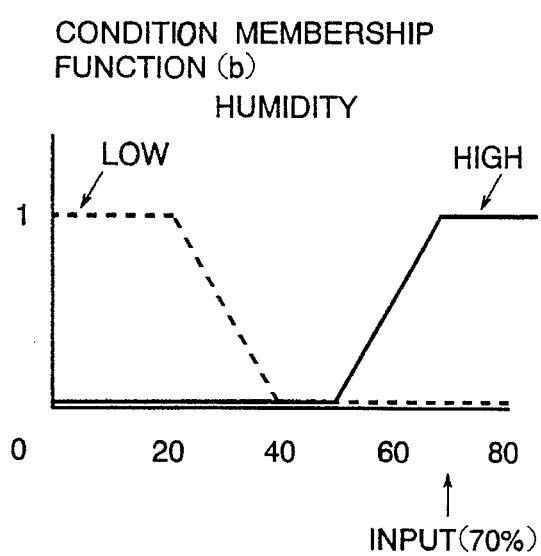
FIG. 3B is a graph showing a condition membership function (b) illustrating the application of the fuzzy inference operation according to a preferred embodiment of the invention.
Figure 3C:
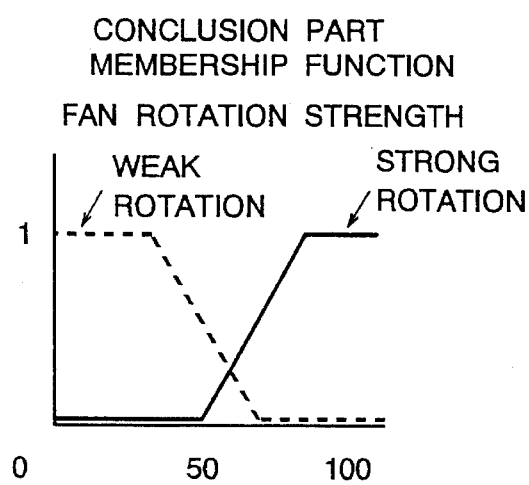
FIG. 3C is a graph showing a conclusion part membership function illustrating the application of the fuzzy inference operation according to a preferred embodiment of the invention.

FIGS. 3A and 3B show the membership functions for the condition part related to the temperature and the humidity, respectively. FIG. 3C gives the membership function for the conclusion part relating to the rotation strength of the fan in the air conditioner.

Suppose now that the temperature of 20° C. and the humidity of 70% are given as the input variables. The minimum membership value for the condition part is supposed to be set to "0" here.

Figure 3D:
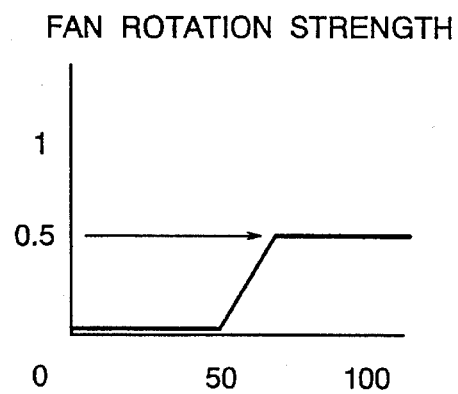
FIG. 3D is a graph showing a fan rotation strength function illustrating the application of the fuzzy inference operation according to a preferred embodiment of the invention.
Figure 3E:
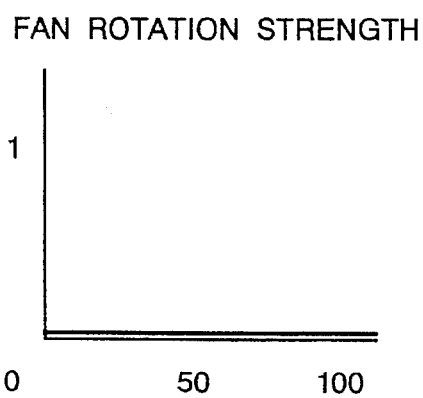
FIG. 3E is a graph showing a fan rotation strength function resulting from the fuzzy inference operation according to the invention.
Figure 4A:
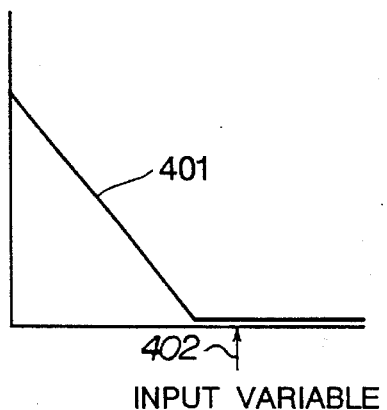
FIG. 4A is a graph showing an antecedent part membership function (a) illustrating a prior MIN value processing.
Figure 4B:
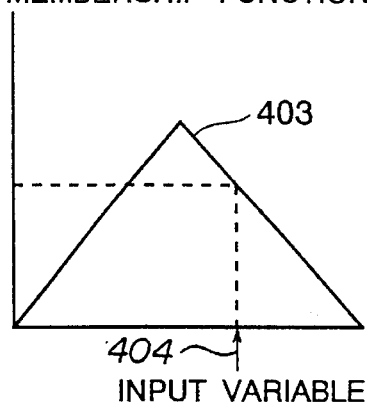
FIG. 4B is a graph showing an antecedent part membership function (b) illustrating a prior MIN value processing.
Figure 4C:
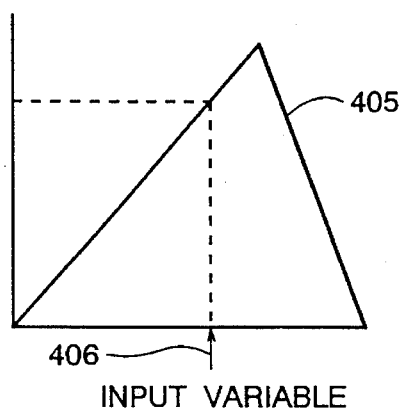
FIG. 4C is a graph showing an antecedent part membership function (c) illustrating a prior MIN value processing.
Figure 4D:
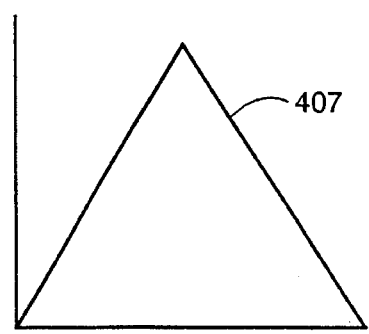
FIG. 4D is a graph showing a fan rotation strength function illustrating a prior MIN value processing.
Figure 4E:
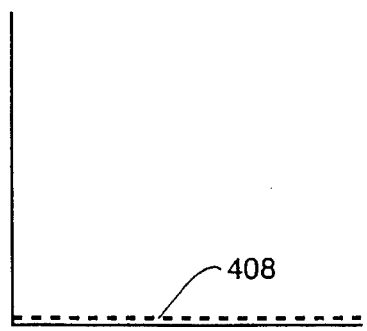
FIG. 4E is a graph showing a fan rotation strength function after the prior MIN value processing.
Figure 5A:
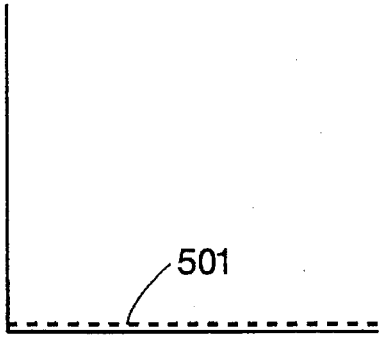
FIG. 5A is a graph showing the MIN value operation result (a) illustrating a prior MAX value processing.
Figure 5B:
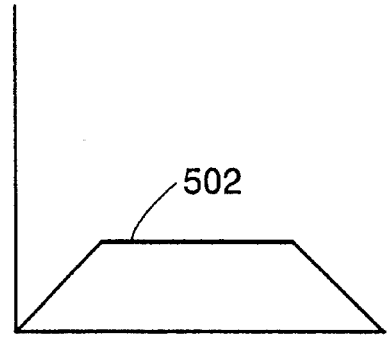
FIG. 5B is a graph showing the MIN value operation result (b) illustrating a prior MAX value processing.
Figure 5C:
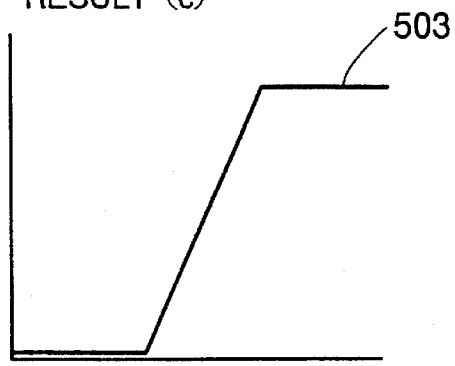
FIG. 5C is a graph showing the MIN value operation result (c) illustrating a prior MAX value processing.
Figure 5D:
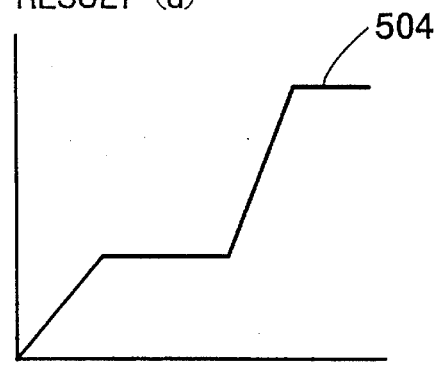
FIG. 5D is a graph showing the MIN value operation result (d) illustrating a prior MAX value processing.
Figure 6:
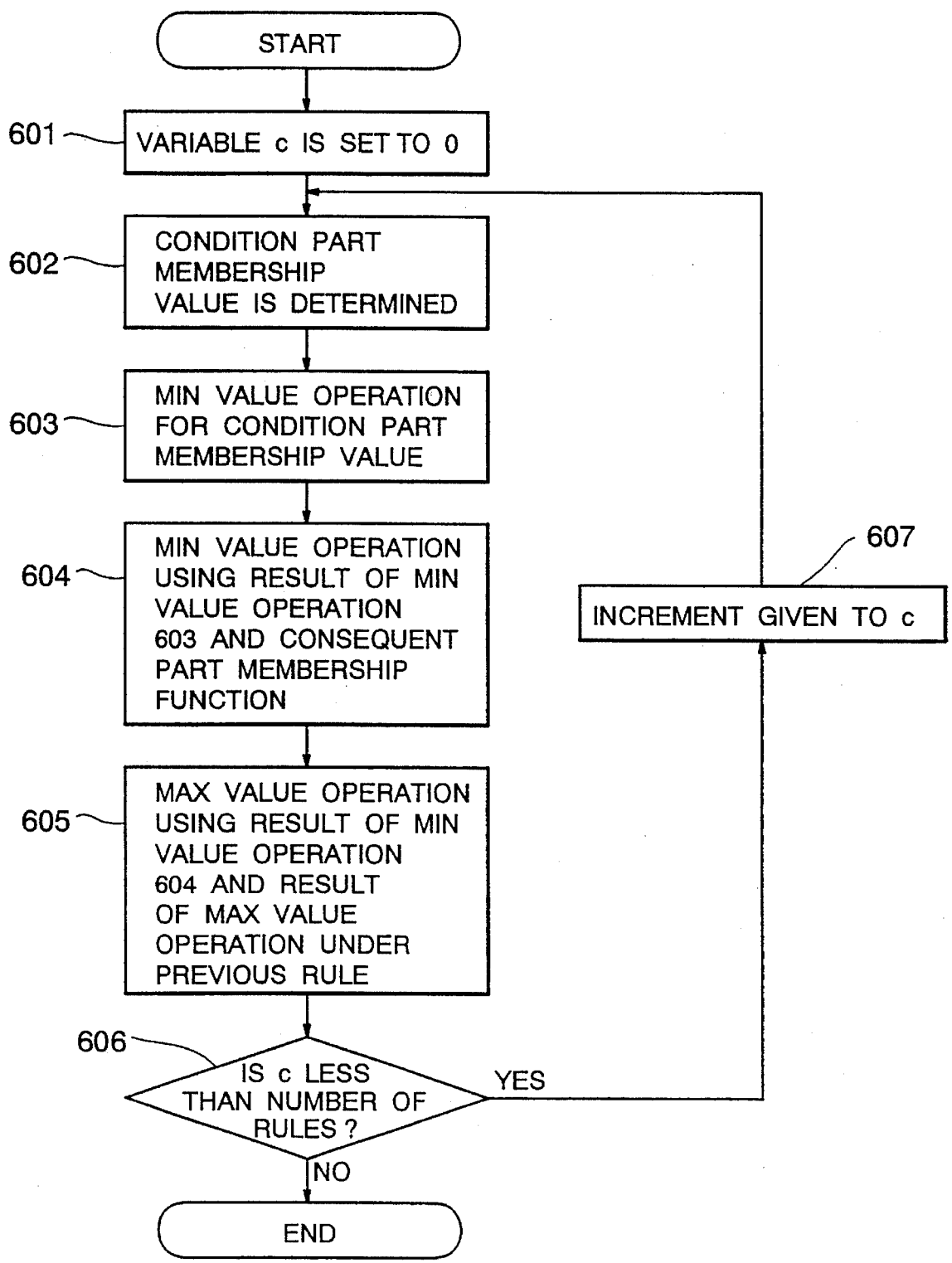
FIG. 6 is a flowchart to show an example of the conventional fuzzy inference operation method.

According to Rule 1, the condition part membership value for a variable indicating the temperature of 20° C. can be determined by referring to the condition part membership function in FIG. 3A. From the figure, the condition part membership value is 0.5. Still following Rule 1, the condition part membership value for another input variable indicating the humidity of 70% is determined by referring to the condition part membership function in FIG. 3B, and it is found to be "1". Since these condition part membership values are larger than the above minimum value, they are subjected to MIN value operation. The result of this MIN value operation using the condition part membership values for temperature and humidity is 0.5. By further subjecting this operation result to another MIN value operation together with the conclusion part membership function as shown in FIG. 3C, the result as shown in FIG. 3D can be obtained. In this case, where no MAX value operation has been performed before, the MIN operation result as shown in FIG. 3D is used as the MAX value operation result.

Similarly, under Rule 2, the condition part membership value for an input variable indicating that the temperature is 20° C. is determined with referring to the condition part membership function in FIG. 3A, and it is found to be "0" from the figure. Now under Rule 1, the condition part membership value for another input variable indicating the humidity of 70% is determined by referring to the condition part membership function in FIG. 3B, and it is found to be "0". Since these condition part membership values are equal to the above minimum value, they are not subjected to the MIN value operation as above. They are not subjected to the above MAX value operation, either. The final result output is as shown in FIG. 3D.

If, under Rule 2, the determined condition part membership value is not checked to see whether it is equal to the minimum value, the condition part membership values for the temperature and humidity ("0" for both) are subjected to the MIN value operation to obtain the operation result "0". Further, the result "0" of the MIN value operation and the conclusion part membership function are subjected to MIN value operation and to obtain again the result "0". Further, since a MAX value operation according to Rule 1 has been performed in this case, the MIN value operation result "0" (FIG. 3E) and the MAX value operation result "0.5" under Rule 1 (FIG. 3D) are subjected to MAX value operation and the final result as shown in FIG. 3D is obtained. This final result is exactly the same as the one above when the MIN and MAX value operations are omitted under Rule 2. Thus, the results of MIN and MAX value operations for Rule 2 do not at all affect the final result.

Therefore, if the condition part membership value determined is the minimum value, the MIN and MAX value operations can be omitted, which results in reduced operation time.

Figure 2A:
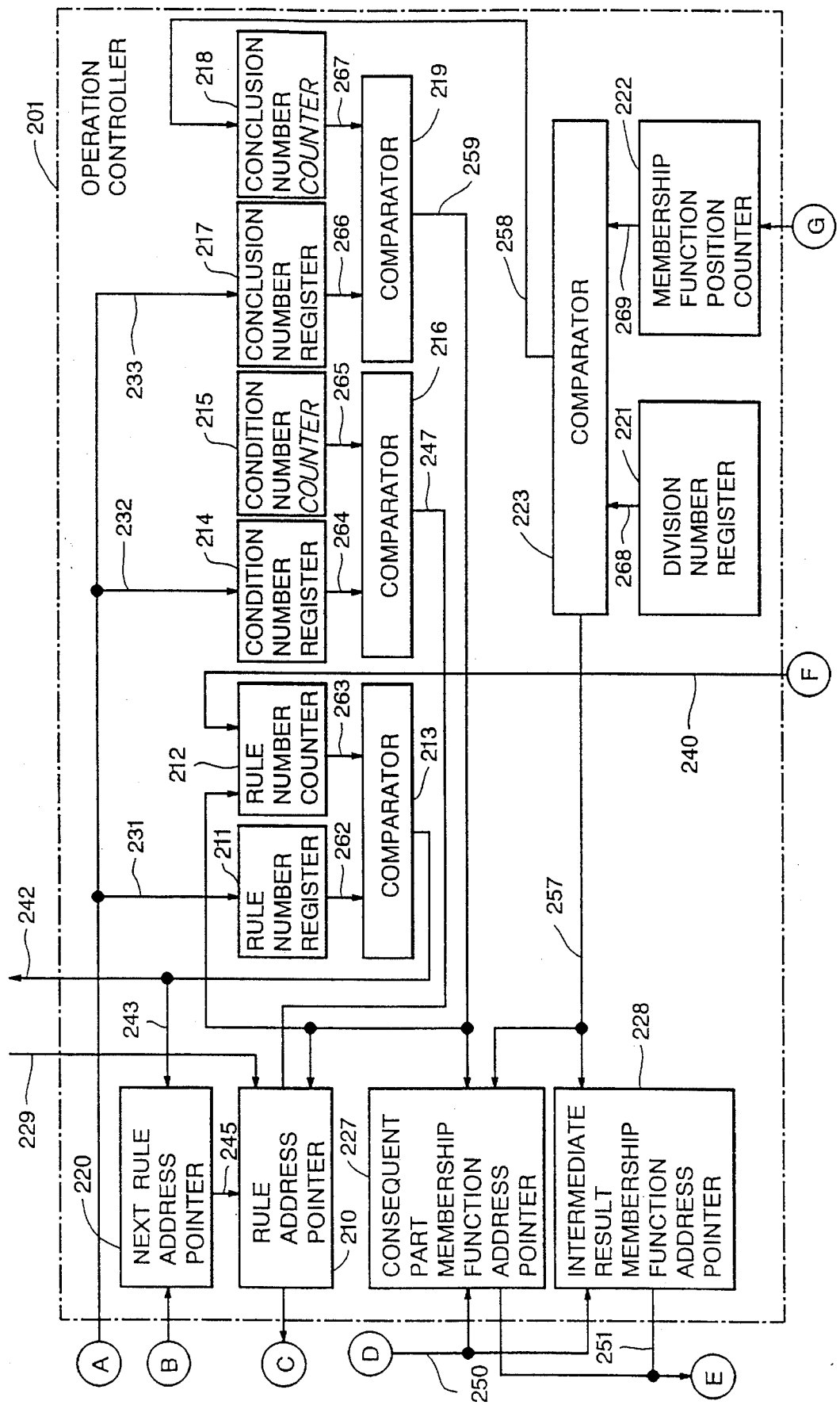

FIGS. 2A and 2B are a block diagram to show the configuration of an embodiment of a fuzzy inference operation device according to the present invention.

A fuzzy inference operation device according to this embodiment comprises an operation controller 201, a rule storage 202, an input variable storage 203, a membership function storage 204, a condition part membership value for address determination unit 205, a condition part membership value judgment unit 206, a MIN value operation unit for condition part membership value 207, a MIN value operation unit for conclusion part membership function 208, and a MAX value operation unit 209.

The operation controller 201 has a rule number register 211, a condition number register 214, a conclusion number register 217 and a division number register 221 to set the rule number, condition number, conclusion number and conclusion part membership function division number respectively. The operation controller 201 is also provided with a rule number counter 212, a condition number counter 215, a conclusion number counter 218 and a membership function position counter 222 to count the numbers of rules, conditions, conclusions and conclusion part membership function divisions respectively as well as comparators 213, 216, 219 and 223 to compare the values at the counters 212, 215, 218 and 222 with those at the registers (211, 214, 217 and 221). It further comprises a rule address pointer 210 where the rule address is set for increment, a next rule address pointer 220 to set the next rule address, a conclusion part membership function address pointer 227 where the conclusion part membership function address is set for increment and an intermediate result membership function address pointer 228 where the intermediate result membership function address is set for increment.

The rule storage 202 stores the numbers of rules, conditions and conclusions, the condition part membership function address, the conclusion part membership function address, the initial address of the next rule and operation rules. The input variable storage 203 stores input variables to determine the condition part membership value. The condition part membership value address determination unit 205 determines the address of the condition part membership value based on the applicable input variable and the condition part membership function address.

The membership function storage 204 stores the condition part membership function, the conclusion part membership function and the intermediate result membership function. The intermediate result membership function has as its initial value the minimum value µ-min for a membership value over the entire area of the membership functions. The intermediate result membership function is the conclusion part membership function obtained from MIN value operation using the MIN operation value of the condition part membership value and represents the membership function during MAX value operation.

The condition part membership value judgment unit 206 comprises registers 224 and 225 and a comparator 226 and judges whether the applicable membership value is the minimum value µ-min for a membership value. The MIN value operation unit for condition part membership value 207 executes MIN value operations for condition part membership values. The MIN value operation unit for conclusion part membership function 208 subjects the result given by the MIN value operation unit for condition part membership value 207 and the conclusion part membership function to MIN value operation. The MAX value operation unit 209 subjects the result given by the MIN value operation unit for conclusion part membership function 208 and the result of MAX value operation using the immediately preceding rule to the MAX value operation.

In FIGS. 2A and 2B are the fuzzy inference operation device according to this embodiment is characterized by the provision of the condition part membership value judgment unit 206, whose result is used for control of the rule number counter 212 so as to reduce the operation time.

Next, the operation of a fuzzy inference operation device according to this embodiment with the above configuration is described.

Firstly, the registers and counters are reset. The number of divisions for the conclusion part membership function is set at the division number register 221 and the minimum value µ-min for a condition part membership value is set at the register 224. From outside of the operation controller 201, a rule address 229 is set at the rule address pointer 210. The rule address pointer 210 outputs a rule address 230 to the rule storage 202. According to the input rule address 230, the rule storage 202 outputs a rule number 231 to the rule number register 211, a condition number 232 to the condition number register 214, a conclusion number 233 to the conclusion number register 217 and a next rule initial address 234 to the next rule address pointer 220.

The rule storage 202 also outputs a condition part membership function address 235 to the condition part membership value address determination unit 205 and an input variable attribute signal 236 to the input variable storage 203.

The input variable storage 203 in turn outputs an input variable 237 to the condition part membership value address determination unit 205. The condition part membership value address determination unit 205 determines a condition part membership value address 238 based on the inputs including the condition part membership function address 235 and the input variable 237, and then outputs the determined value to the membership function storage 204. The membership function storage 204 refers to the membership function according to the condition part membership address 238 which has been input and outputs a condition part membership value 239 to the register 225 at the condition part membership value judgment unit 206 and the MIN value operation unit for condition part membership value 207.

The comparator 226 at the condition part membership value judgment unit 206 compares the minimum value µ-min 260 set in advance at the register 224 with a value 261 at the register 225. If they are identical, the comparator 206 sends an increment signal 240 to the rule number counter 212; if not, it sends an operation request signal 241 to the MIN value operation unit for condition membership value 207.

The rule number counter 212 increments its count when the increment signal 240 is input. The comparator 213 compares a rule number 262 set at the rule number register 211 and a count 263 at the rule number counter 212. If they are identical, the comparator 213 outputs a MIN-MAX operation completion signal 242 outside of the operation controller 201 to terminate the procedure. If not, it sends a rule address output request signal 243 to the next rule address pointer 220. Upon output of a next rule address 245 kept at the next rule address pointer 220 to the rule address pointer 210, the next rule operation is started.

Upon input of an operation request signal 241, the MIN value operation unit for condition part membership value 207 executes MIN value operation and then outputs its result 246 to the MIN value operation unit for conclusion part membership function 208. The condition number counter 215 increments its count. The comparator 216 compares a condition number 264 set at the condition number register 214 and the value at the condition number counter 265. If they are not identical, the rule address pointer 210 increments the rule address and outputs the rule address 230 to the rule storage 202 so as to continue the operation. If they are identical, a full condition number achievement signal 247 is output to the rule address pointer 210.

The rule address pointer 210 inputs the full condition number achievement signal 247 so as to increment the rule address and causes the rule address 230 to be output to the rule storage 202. From the rule storage 202, a conclusion part membership function address 248 is set to the conclusion part membership function address pointer 227 and an intermediate result membership function address 249 is set to the intermediate result membership function address pointer 228.

The conclusion part membership function address pointer 227 refers to the membership function storage 204 for the conclusion part membership function value 252 at the address 250 pointed by the conclusion part membership function address pointer 227 and output the value to the MIN value operation unit for conclusion part membership function 208. The intermediate result membership function address pointer 228 outputs the intermediate result membership function value 253 at the address 251 given by the intermediate result membership function address pointer 228 to the MAX value operation unit 209 with referring to the membership function storage 204.

The MIN value operation unit for conclusion part membership function 208 subjects the MIN value operation result 246 at the MIN value operation unit for condition part membership value 207 and the conclusion part membership function value 252 to the MIN value operation and sends the result of that MIN value operation 254 to the MAX value operation unit 209. The MAX value operation unit 209 subjects the MIN value operation result 254 at the MIN value operation unit for conclusion part membership function 208 and the membership function value 253 of the intermediate result to the MAX value operation and provides the MAX value operation result 225 at the position indicated by the intermediate result membership function address pointer 228 and outputs a MAX value operation completion signal 256 at the membership function position counter 222.

Upon input of the MAX value operation completion signal 256, the membership function position counter 222 increments the counter value. The comparator 223 compares the value 268 at the division number register 221 and the value 269 at the membership function position counter 222. If they are not identical, the comparator 223 outputs the increment signal 257 to the conclusion part membership function address pointer 227 and the intermediate result membership function address pointer 228 to continue the operation. If they are identical, the increment signal 258 is output to the conclusion number counter 218. The conclusion number counter 218 increments the counter value upon input of the increment signal 258. The comparator 219 compares the value 266 at the conclusion number register 217 and the value 267 at the conclusion number counter 218. If they are not identical, the comparator 219 outputs the increment signal 259 to the rule address pointer 210 to proceed to the next conclusion operation. If they are identical, the increment signal 244 is output to the rule number counter 212.

Thus, checking of the condition part membership value to see whether it is the minimum value μ-min for a membership value enables, if applicable, omission of the MIN value operation for the condition part membership function value, MIN value operation using the result of the above MIN value operation and the conclusion part membership function and the MAX value operation using the MIN value operation result and the MAX value operation result under the immediately preceding rule before the next rule operation, which results in reduced time for operation.

Obviously many modifications and variations of the present invention are possible. It is intended to cover in the appended claims all such modifications as fall within the true spirit and scope of the invention.

What is claimed is:

1. A fuzzy inference operation method for choosing between different processing routines comprising the steps of:

A) determining a condition part membership value by referring a singleton input variable to a condition part membership function located in a membership function storage unit, B) judging whether the determined condition part membership value is a predetermined minimum value using a comparator C1) when said condition pan membership value is judged to be said predetermined minimum value, selecting said minimum value as a finally desired membership value and C2) when said condition part membership value is judged not to be said predetermined minimum value, continuing the processing by determining a finally desired membership value by executing predetermined MIN and MAX value operations for the determined condition part membership value using MIN and MAX value operation units.

2. A fuzzy inference operation method for choosing between different processing routines comprising the steps of:

A) determining a condition part membership value by referring a singleton input variable to a condition part membership function located in a membership function storage unit, B) judging whether the determined condition part membership value is a predetermined minimum value using a comparator, C1) when said condition part membership value is judged to be said predetermined minimum value, selecting said predetermined minimum value as a finally desired membership value C2) when said condition part membership value is judged not to be said predetermined minimum value, continuing the processing for determining a finally desired membership value comprising the steps of:
 a) performing a first MIN value operation using a MIN value operation unit for comparing two or more membership values and selecting a smaller one as an operation result
 b) repeating said referring step, said selecting step and said first MIN value operation for said condition part membership value for a number of times equal to a predetermined condition number,
 c) performing a second MIN value operation with said MIN value operation unit using a result of said first MIN value operation and a conclusion part membership function,
 d) repeating said second MIN value operation for a number of times equal to a division number for said membership function,
 e) judging whether any MAX value operation has been executed using a comparator,
 f) when any MAX value operation has been executed, executing a first MAX value operation with a MAX value operation unit using a result of the second MIN value operation and a first MAX value, and
 g) when any MAX value operation has not been executed, executing a second MAX value operation with said MAX value operation unit using the result of the second MIN value operation and the first MAX value operation.

3. A fuzzy inference operation device comprising:

condition part membership value determination means for referring a condition part membership function to a singleton input variable for determining a condition part membership value, MIN value operation means for comparing two or more condition part membership values and selecting a smaller one as an operation result, MAX value operation means for comparing two or more condition part membership values and selecting a larger one as an operation result, rule storage means for storing rules specifying said operations, condition part membership value judgment means for judging whether the condition part membership value is a finally desired membership value, said judgment means comprising a register to store a predetermined minimum value and a comparator to compare said condition part membership value with said predetermined minimum value stored in said register, and control means for controlling the device to omit operations by said MIN and MAX value operation means for an applicable condition part membership value when said condition part membership value is said predetermined minimum value.

4. A fuzzy inference operation device comprising:

condition part membership value determination means for referring a condition part membership function to a singleton input variable for determining a condition part membership value, MIN value operation means for comparing two or more membership values and selecting a smaller one as an operation result, MAX value operation means for comparing two or more membership values and selecting a larger one as the operation result, rule storage means for storing a plurality of rules specifying the operations, rule counting means for counting a number of rules to be applied to said operations and fetching a rule applicable to each operation from said rule storage means, and control means for judging whether the condition part membership value is a predetermined minimum value if the condition part membership value is not judged to be said predetermined minimum value, requesting said MIN and MAX value operation means to execute an operation and if the condition part membership value is judged to be said predetermined minimum value, outputting a signal to increment a count to said rule counting means so as to omit the operation by said MIN and MAX value operation means for an applicable condition part membership value.

5. A fuzzy inference operation device of claim 4 wherein said control means comprises:

a register to store said predetermined minimum value and a comparator for comparing said condition part membership value with said predetermined minimum value stored in said register, wherein if the condition part membership value is not said predetermined minimum value, said comparator outputs an operation request signal to said MIN and MAX value operation means and, if the condition part membership value is said predetermined minimum value, said comparator outputs a signal to increment a count to said rule counting means so as to omit the operations by said MIN and MAX value operation means for an applicable condition part membership value.

* * * * *